(12) United States Patent
Hoffmann

(10) Patent No.: US 9,046,195 B2
(45) Date of Patent: Jun. 2, 2015

(54) TECHNIQUES FOR COATING PIPES

(75) Inventor: Philippe Hoffmann, Rousset les Vignes (FR)

(73) Assignee: Acergy France SA, Suresnes (FR)

( * ) Notice: Subject to any disclaimer, the term of this patent is extended or adjusted under 35 U.S.C. 154(b) by 0 days.

(21) Appl. No.: 13/808,570

(22) PCT Filed: Jul. 4, 2011

(86) PCT No.: PCT/IB2011/001859
§ 371 (c)(1),
(2), (4) Date: Mar. 15, 2013

(87) PCT Pub. No.: WO2012/004665
PCT Pub. Date: Jan. 12, 2012

(65) Prior Publication Data
US 2013/0170913 A1  Jul. 4, 2013

(30) Foreign Application Priority Data

Jul. 5, 2010  (GB) .................................... 1011283.7
Apr. 20, 2011  (GB) .................................... 1106690.9

(51) Int. Cl.
*F16L 1/12* (2006.01)
*B29C 45/04* (2006.01)
*B29C 45/16* (2006.01)
*B29C 45/73* (2006.01)
*F16L 1/20* (2006.01)
*F16L 13/02* (2006.01)
(Continued)

(52) U.S. Cl.
CPC . *F16L 1/12* (2013.01); *B29C 45/04* (2013.01); *B29C 45/14336* (2013.01); *B29C 45/14377* (2013.01); *B29C 45/14598* (2013.01); *B29C 45/1671* (2013.01); *B29C 45/73* (2013.01); *B29C 2045/0032* (2013.01); *B29C 2045/7387* (2013.01); *B29K 2705/00* (2013.01); *F16L 1/206* (2013.01); *F16L 13/0272* (2013.01); *F16L 58/181* (2013.01); *F16L 59/20* (2013.01); *F16L 9/00* (2013.01)

(58) Field of Classification Search
USPC .......................... 405/169, 170, 184.1; 249/90
See application file for complete search history.

(56) References Cited

U.S. PATENT DOCUMENTS 3,578,233 A * 5/1971 Meister et al. ................. 228/5.1
4,358,417 A * 11/1982 Beinhauer .................. 264/36.16
(Continued)

FOREIGN PATENT DOCUMENTS

DE           3734256 A1    4/1989
DE   10 2007 018 519 A1   10/2008
(Continued)

*Primary Examiner* — Tara M. Pinnock
(74) *Attorney, Agent, or Firm* — Levy & Grandinetti

(57) ABSTRACT

A method of coating a field joint of a pipeline to accelerate the cycle time comprises positioning a mould tool around the field joint to define a mould cavity and injecting plastics material into the mould cavity through a plurality of gates in the mould tool, spaced along the mould cavity. The material is injected through different gates at different times as the mould cavity is filled, specifically through at least one first gate to advance a melt front within the mould cavity, and subsequently through at least one second gate spaced from the first gate, preferably when the melt front passes the second gate. First and second mould tools may be positioned successively around the field joint to create inner and outer coatings on the field joint. An insert may be positioned in the mould cavity to be embedded in the injected plastics material.

42 Claims, 11 Drawing Sheets

(51) Int. Cl.
- *F16L 58/18* (2006.01)
- *F16L 59/20* (2006.01)
- *F16L 9/00* (2006.01)
- *B29C 45/14* (2006.01)
- *B29C 45/00* (2006.01)
- *B29K 705/00* (2006.01)

(56) References Cited

U.S. PATENT DOCUMENTS

| | | | |
|---|---|---|---|
| 4,459,251 A | * | 7/1984 | Eldridge et al. ............. 264/40.5 |
| 4,812,115 A | * | 3/1989 | Kemp ........................ 425/405.2 |
| 4,993,875 A | * | 2/1991 | Nicholson et al. ............ 405/157 |
| 5,127,116 A | | 7/1992 | Greig |
| 5,413,385 A | * | 5/1995 | Hilbush, III .................... 285/15 |

FOREIGN PATENT DOCUMENTS

| | | |
|---|---|---|
| GB | 2 165 910 | 4/1986 |
| GB | 2 462 149 | 2/2010 |
| JP | 57-026803 | 2/1982 |
| JP | 62-083583 A | 4/1987 |
| WO | WO 01/36173 A1 | 5/2001 |
| WO | WO 2006/060209 | 6/2006 |
| WO | WO 2009/207686 A1 | 5/2009 |

* cited by examiner

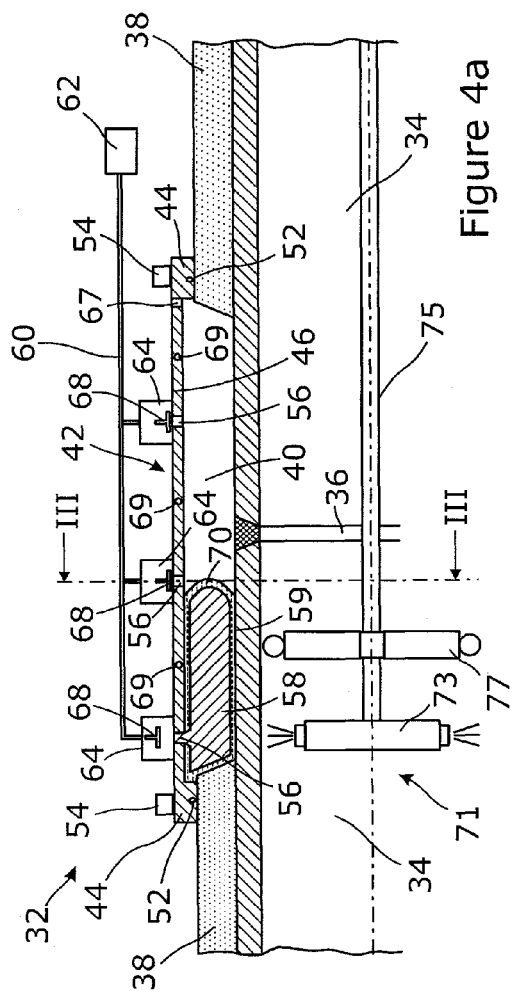
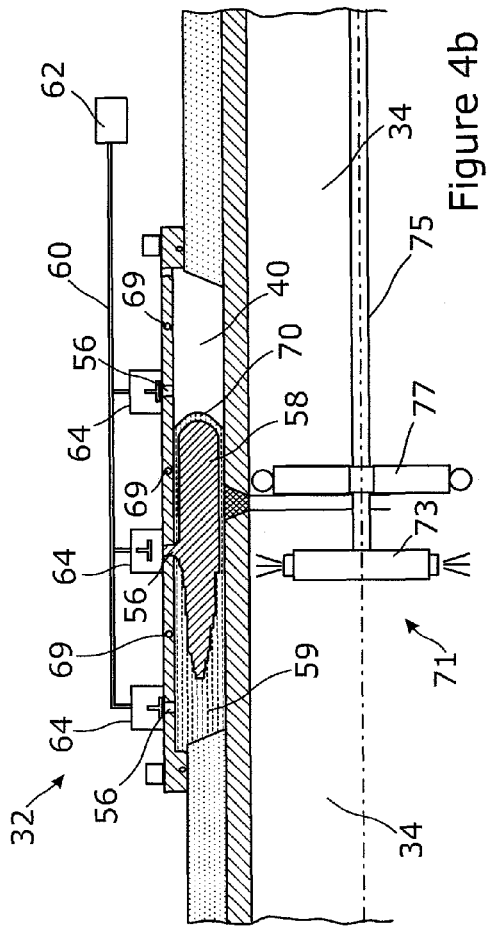

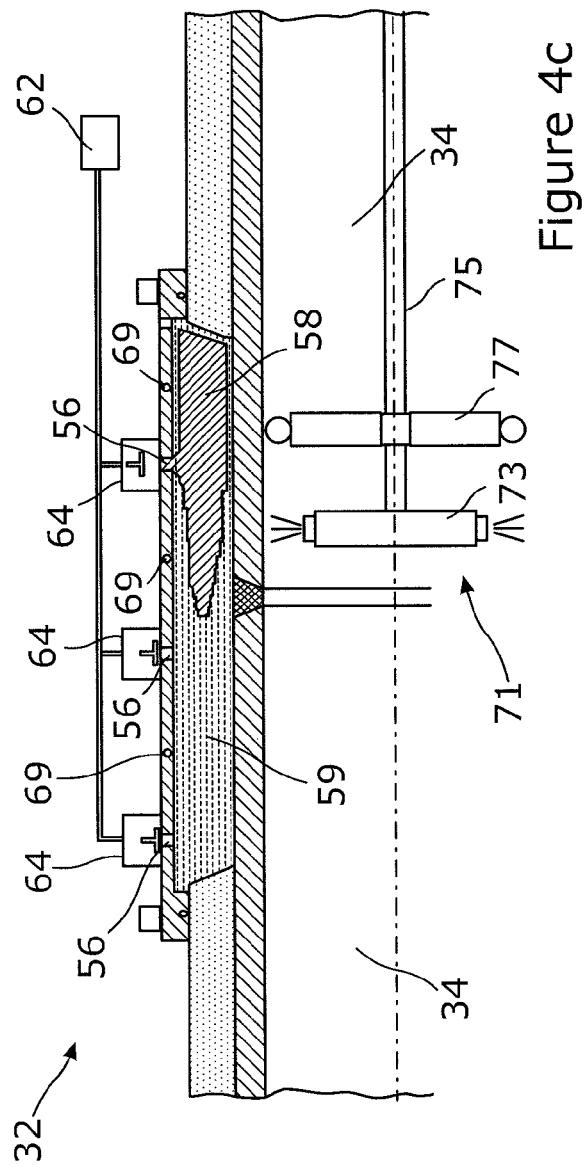

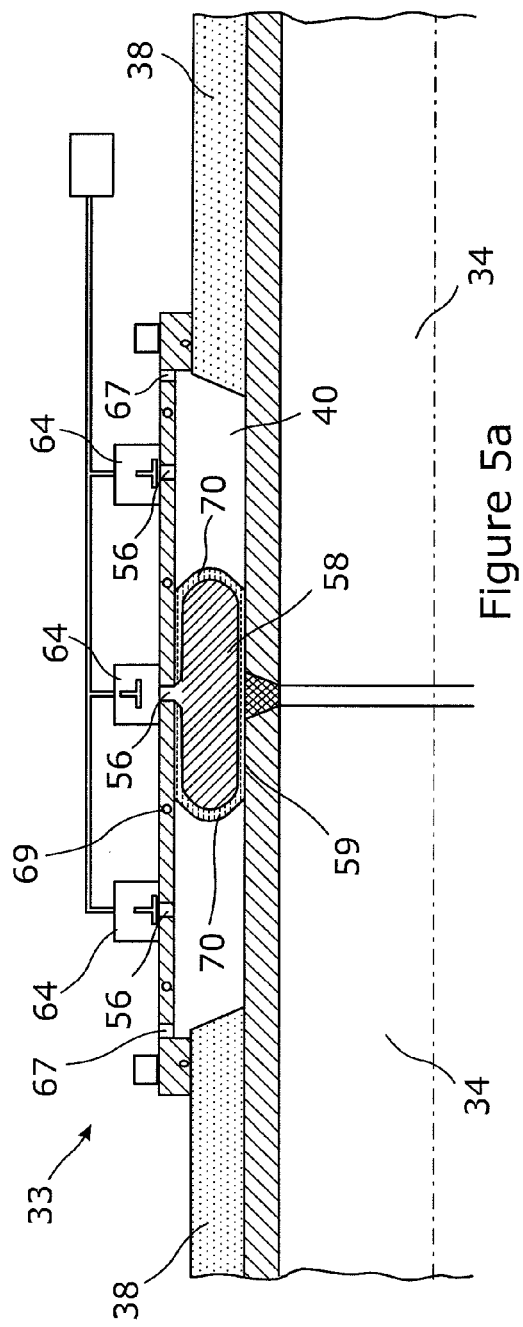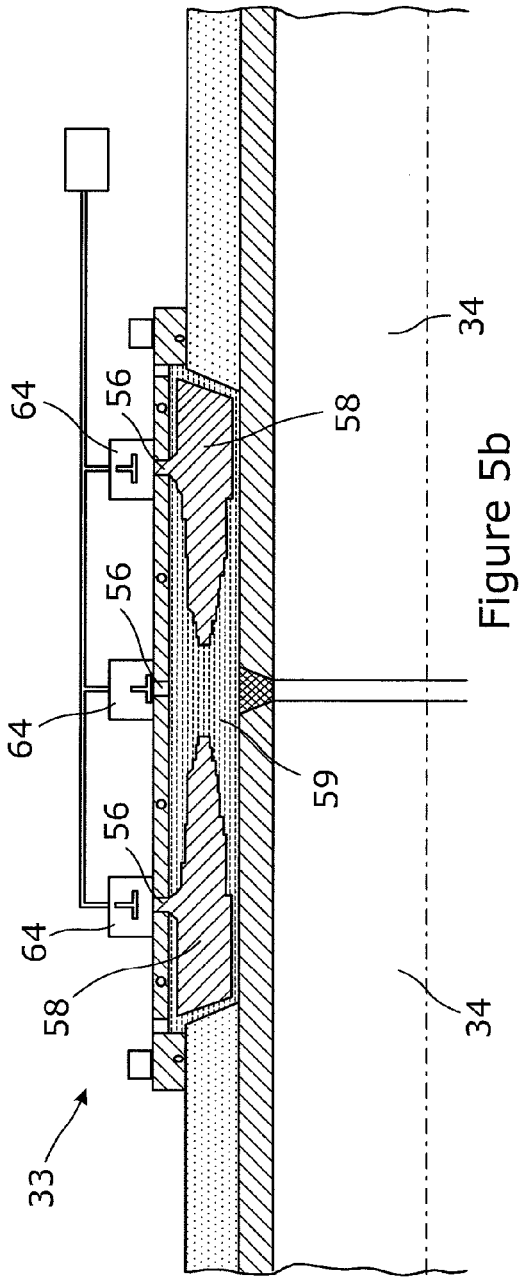
Figure 5a
Figure 5b

TECHNIQUES FOR COATING PIPES

This Application is the U.S. National Phase of International Application Number PCT/IB2011/001859 filed on Jul. 4, 2011, which claims priority to Great Britain Application Number 1106690.9 filed on Apr. 20, 2011, and Great Britain Application Number 1011283.7 filed on Jul. 5, 2010.

This invention relates to coating pipes, in particular to apparatus and techniques for coating pipeline field joints and to pipelines having field joints coated by those techniques.

Pipelines used in the oil and gas industry are usually formed of lengths of steel pipe—'pipe joints'—welded together end-to-end as the pipeline is laid. It is also common to fabricate a pipe stalk onshore at a spoolbase and to transport the prefabricated pipe offshore for laying, for example in a reel-lay operation in which pipe stalks are welded together and stored in a compact spooled form on a pipelay vessel.

To mitigate corrosion of the pipeline and optionally also to insulate the fluids that the pipeline carries in use, the pipe joints are pre-coated with protective coatings that, optionally, are also thermally insulating. Many variations are possible in the structure and composition of the coating to obtain the required protective or insulative properties. However, polypropylene (PP) is most commonly used to coat the pipe joints from which pipelines are made. For example, a so-called three-layer PP (3LPP) coating may be used for corrosion protection and a so-called five-layer PP (5LPP) coating may be used for additional thermal insulation. Additional layers are possible.

A 3LPP coating typically comprises an epoxy primer applied to the cleaned outer surface of the steel pipe joint. As the primer cures, a second thin layer of PP is applied so as to bond with the primer and then a third, thicker layer of extruded PP is applied over the second layer for mechanical protection. A 5LPP coating adds two further layers, namely a fourth layer of PP modified for thermal insulation e.g. glass syntactic PP (GSPP) or a foam, surrounded by a fifth layer of extruded PP for mechanical protection of the insulating fourth layer.

A short length of pipe is left uncoated at each end of the pipe joint to facilitate welding. The resulting 'field joint' must be coated with a field joint coating to mitigate corrosion and to maintain whatever level of insulation may be necessary for the purposes of the pipeline.

Where a pipeline is laid offshore, welding and field joint coating is commonly performed aboard a pipelaying vessel such as a laybarge that launches the resulting pipe string using S-lay or J-lay methods.

In the S-lay method, a pipe string is assembled on the deck of the vessel in a horizontal firing line with multiple welding stations. The pipe string is launched from the vessel over a stinger comprising a succession of rollers, from which the pipe string curves down through the water to a touchdown point on the sea bed. Field joint coating is carried out upstream of the stinger, at one or more coating stations or 'dope stations' to which the pipe string is advanced in stepwise fashion after welding.

Field joint coating is also employed during J-lay installation, in which pipe joints are lifted into a near-vertical orientation in a tower for welding to the end of the pipe string. Field joint coating is carried out downstream of the welding station in the tower, just before the pipe string is launched downwardly from the vessel into the sea.

In principle, the S-lay method allows faster pipelaying than the J-lay method but J-lay is necessary in challenging pipelaying situations where water depth and strong currents make S-lay impractical, without imparting large strains to the pipeline.

Whether using S-lay or J-lay methods, the speed of pipelaying depends upon minimising the timescale of all operations on the critical path. Given the stepwise, sequential processing steps of welding and coating, it is particularly important that neither welding nor coating take longer than is necessary or that one process takes substantially longer than the other. Otherwise there will be a 'bottleneck' in the pipeline installation process.

The faster welding speed possible using the S-lay method means that a shorter period of time is available for field joint coating in S-lay than in J-lay. This short time period available for field joint coating in the S-lay method has previously favoured a cast-moulded polyurethane (CMPU) technique that relies on curing rather than cooling to solidify the coating. This allows a cycle time of circa five minutes, which broadly corresponds to the cycle time of welding operations in the S-lay method and so removes the coating operation from the critical path.

In CMPU techniques, the exposed surface of the pipe at the abutting welded ends of the pipe joints is cleaned and a primer is applied. A mould is then positioned to enclose the field joint and a two-component urethane material is cast into the annular cavity defined within the mould around the field joint. The urethane material then cures, cross-linking and solidifying to form polyurethane (PU) in an irreversible chemical reaction.

When the PU has cured to a self-supporting extent, the mould is removed to leave the field joint coating in place around the region of the weld. Curing may continue thereafter as the PU coating approaches its design strength.

The mould used in a CMPU operation does not need to withstand high pressures and so can be of compact, lightweight and simple design.

The speed of the chemical reaction involved in curing of CMPU is largely independent of heating or the size or thickness of the field joint coating, and there is no need for cooling time to set the coating. To the contrary, the heat generated by the exothermic curing reaction helps to accelerate the reaction. Whilst heating can promote the curing reaction, it cannot reverse the curing reaction as PU is a thermoset: excessive temperature would merely degrade the PU rather than melt it.

An example of a CMPU technique is disclosed in DE 102007018519 in relation to a gas pipe or other essentially static pipe, where coating is not performed as part of an ongoing station-by-station fabrication process in the manner of S-lay pipelaying or onshore fabrication operations. There is therefore much less time pressure than is encountered in offshore or onshore pipe fabrication operations.

DE 102007018519 discloses a formwork element for applying a joint coating material to a weld region of a coated steel pipe. The formwork element constitutes a mould that encloses the weld region of the pipe and defines an annular cavity around the weld region. A coating material such as PU is admitted to the cavity through one or more supply ports on the bottom of the formwork element. Additionally, one or more vents are provided on the top of the formwork element to allow air to escape as the cavity fills with PU. PU entering the cavity through the supply port(s) fills the cavity upwardly from the bottom, rising toward the vent(s) and hence advancing circumferentially around the pipe until the cavity is full.

Whilst continuous filling of the cavity from the bottom supply port(s) upwards is preferred in DE 102007018519, larger pipes may require additional supply ports aligned in cross-section with the, or each, bottom supply port and spaced around the circumference of the formwork element.

These additional supply ports provide for supplementary injection of PU in a circumferential 'cascade' arrangement to allow consistent and homogeneous bottom-up filling of the cavity before the PU cures.

Bottom-up filling is commonly employed in a CMPU technique such as that of DE 102007018519 because a thermoset resin like urethane has low viscosity before it cures to form PU. Consequently there is a high risk of bubbles being entrained in the material during injection due to turbulence. That risk is mitigated by injecting gently and filling the mould progressively in a manner that discourages bubble formation. Bottom-up filling also encourages any bubbles that may form to rise to the top of the injected liquid before it cures, for venting with the air that is expelled as the mould cavity fills.

A CMPU field joint coating has disadvantages. Key disadvantages arise from the dissimilarity between PP and PU, which undermines the bond strength between the pipe coating and the field joint coating. This introduces a risk that cracks may occur at the interface between the pipe coating and the field joint coating. Any such cracks may allow water to reach the outer surface of the pipe, thus corroding the pipe. Water ingress may also reduce the adhesion of the coating to the pipe and may additionally degrade the coating, particularly due to hydrolysis of the PU under heat emanating from within the pipeline in use; this is particularly significant under the high-pressure conditions of deep water. Degradation or loss of adhesion of the coating will tend to permit further corrosion of the pipe and may also reduce its thermal insulation.

These disadvantages of a CMPU field joint coating may be mitigated by instead using PP as the field joint coating in an injection moulded polypropylene (IMPP) process. In an IMPP process, the exposed ends of the abutting pipe are cleaned, primed and heated, for example using induction heating or gas flames. The exposed chamfers at the ends of the pipe coatings are also heated. The field joint is then enclosed by a mould that defines an annular cavity around the field joint. Molten PP is injected into the cavity under high pressure. Once the PP has cooled to a self-supporting extent, the mould is removed, leaving a tube of PP around the field joint as the field joint coating. This tube is continuous with the tubular coating surrounding the pipe joints, such that the same or compatible coating materials extend all along the length of the pipe string.

A field joint coating of IMPP has broadly similar mechanical and thermal properties to a pipe coating of PP. Also, the pipe coating and the field joint coating are sufficiently compatible that they fuse together at their mutual interface, resisting cracking and hence giving longer service life. The service temperature of PP is also markedly higher than PU.

A molten thermoplastic such as PP used in an IMPP process is typically orders of magnitude more viscous than an uncured thermoset resin such as urethane used in a CMPU process. The difference in viscosity is from a few centipoise for a urethane resin to several hundreds of poise for molten PP. Consequently, bubble formation is not such a concern in an IMPP process and therefore the direction of filling of the cavity, whether bottom-up or top-down, is much less important than in a CMPU process.

A typical prior art IMPP process involves injecting PP at one end of a mould enclosing the field joint area like a jacket. The constant flow of injected molten product introduces heat continuously and maintains temperature all along the field joint during the whole duration of the injection process. This slows cooling and hence solidification of the PP.

In this respect, reference is made to FIGS. 1a to 1c of the drawings which show how an IMPP operation may be used to coat a field joint of a pipe on the firing line of a vessel or at an onshore fabrication yard such as a spoolbase. Here, a mould tool 31 encircles a welded field joint created between abutting pipe joints 34, where a circumferential weld 36 attaches the pipe joints 34 to each other.

Each pipe joint 34 is coated, for example with a 5LPP coating 38, and that coating 38 terminates short of the end of each pipe joint 34 with a typically chamfered end shape. An annular gap therefore lies between the opposed ends of the coating 38 around the weld 36, where the exposed external surfaces of the pipe joints 34 need to be coated. For this purpose, the mould tool 31 is fixed around the field joint, extending from one coating 38 to the other and overlapping those coatings 38 to define a mould cavity 40 including the annular gap between the coatings 38. Molten PP 58 or other thermoplastics material is injected into the mould cavity 40 to form a field joint coating.

The mould tool 31 comprises a tube 42 of generally circular cross-section, which is suitably divided longitudinally into two halves. Opposed end portions of the tube 42 seat against the coatings 38 of the respective pipe joints 34 and so have an internal diameter corresponding to the external diameter of the coated pipe joints 34.

The two halves of the mould tool 31 are clamped together to encircle the field joint while resisting internal pressure within the mould tool 31 in use. The mould tool 31 is therefore held in sealing engagement with the coatings 38 of the pipe joints 34. Inwardly-facing seals 52 are provided in the end portions of the mould tool for that purpose. Stiffening rings 54 encircling the end portions of the mould tool 31 also help to maintain structural integrity and sealing.

The tubular wall of the mould tool 31 is penetrated by a gate 56 near one end for injecting molten PP 58 into the mould cavity 40. The molten PP 58 is supplied through a feed line 60 under pressure from a supplying reservoir or machine 62. A vent 67 allows air to escape as the mould cavity 40 fills with molten PP 58. The mould tool 31 also has a cooling system comprising a water jacket created by water pipes 69 disposed in or on the tubular wall of the mould tool 31.

Before the injection moulding operation begins, the bare uncoated external surfaces of the pipe joints 34 are cleaned, primed and heated, as are the chamfered end surfaces of the coatings 38.

In FIG. 1a, the injection moulding operation has begun by injecting molten PP 58 through the gate 56 near one end of the mould cavity 40. The injected melt has already filled that end of the mould cavity 40 and a melt front 70 is progressing along the mould cavity 40 toward the other end of the mould cavity 40. FIG. 1b shows further progress of the melt front 70 as molten PP 58 continues to be injected through the gate 56 and FIG. 1c shows the mould cavity 40 completely filled with the injected melt.

It will be noted from FIGS. 1a to 1c that the outer perimeter of the injected melt soon starts to freeze to form solid PP 59. Freezing occurs most quickly where the injected melt contacts the cooler, conductive surfaces of the mould tool 31 and the pipe 34. However, the inner core of the injected melt remains as molten PP 58 throughout the injection process until the mould cavity 40 has been filled.

The ongoing injection of molten PP 58 continues to input heat to the system, and so does not allow the core of the melt to start cooling and solidifying until the entire mould cavity 40 has been filled and injection can therefore cease. Even after the mould cavity 40 has been filled and injection ceases, the mould tool 31 must remain in place until the injected melt has cooled and solidified to a self-supporting extent. Only then can the two halves of the mould tool 31 be separated and removed from the field joint for re-use on a subsequent field joint.

Hence, using existing techniques, IMPP coating at a single station has a typical cycle time of eight to ten minutes, which cannot compete with the short cycle time of CMPU coating. Consequently, IMPP coating is not suitable for use in S-lay pipeline installation methods especially. Unlike CMPU, the injected molten PP must be allowed time to cool down and this cooling time is strongly dependent on the size and the depth of the mould cavity defining the field joint coating. Whilst the mould can be water-cooled as shown to accelerate cooling, careless forced cooling may reduce the quality of the field joint coating and it still takes too long for the PP to solidify to an extent necessary to resist flattening or other deformation when the pipe string passes over the rollers of the stinger.

IMPP coating may be used in J-lay methods where there is more time to coat the field joint, where the field joint coating will cool quickly upon immersion in water and where the field joint coating will encounter less local deformation during launching. However, IMPP coating lies on the critical path in S-lay methods and introduces a disadvantageous delay.

IMPP coating also suffers from the viscosity of the molten PP and hence the need to pump and contain the PP at high moulding pressures. This adds to the bulk and cost of the mould and of the injection equipment that feeds molten PP to the mould.

It is against this background that the present invention has been made. The invention aims to reduce the cycle time of an IMPP coating operation, hence allowing the benefits of IMPP to be enjoyed without suffering a substantial increase in cycle time in comparison with an IMPU coating operation. The potentially time-saving coating techniques of the invention may be applied beneficially in J-lay methods but for reasons that will be apparent from the above, they have the greatest benefit when used in S-lay methods. The invention will therefore be described in the context of S-lay operations but it should be appreciated that the invention may have benefit in J-lay operations and also in on-shore fabrication of pipelines and during reeling and spooling operations, where there is also a need to shorten the IMPP coating cycle.

From a first aspect, the invention resides in a method of coating a joint of a pipe during fabrication of the pipe from pipe sections, comprising:

positioning a mould tool around the joint to define a mould cavity around the pipe, the mould tool having first and second gates spaced apart from each other;

injecting molten thermoplastics material through the first gate into a first portion of the mould cavity to advance a melt front in the mould cavity toward the second gate;

subsequently injecting molten thermoplastics material through the second gate into a second portion of the mould cavity neighbouring the first portion;

accelerating cooling of the injected material in the first portion of the mould cavity relative to cooling of the injected material in the second portion of the mould cavity; and removing the mould tool from the field joint after the injected material in the mould cavity has cooled to a self-supporting extent.

Cooling of the injected material in the first portion of the mould cavity may be accelerated in various ways, for example: by reducing a rate of injection, or ceasing injection, through the first gate while injecting through the second gate; and/or by cooling the mould tool or the pipe in the region of the first portion. Cooling may be applied locally to the mould tool or the pipe at a cooling position that is moved in accordance with the movement of the melt front. These measures allow the thermoplastics material injected through the first gate to cool while thermoplastics material is being injected through the second gate.

For homogeneity and strength, it is preferred that molten plastics material is injected through the second gate after the melt front passes the second gate. Until the melt front passes the second gate, the second gate is preferably kept closed.

By injecting sequentially at gates or injection ports spaced along the mould, the first portion or segment between the first and second gates is allowed to start cooling as soon as the first gate is closed. The process is repeated for the subsequent gates. Hence, the length of the inner molten zone is reduced. The overall cooling time is thus reduced and also the length over which the field joint coating remains relatively soft is reduced.

Thermoplastics material may be injected through a first gate situated between other gates to advance a melt front from the first gate toward the other gates. It is possible to advance a melt front progressively from one end of the mould cavity to another end of the mould cavity or to advance two melt fronts in opposite directions along or around the mould cavity.

Molten thermoplastics material is suitably injected through a plurality of first and second gates angularly spaced around the field joint. In one example, the first and second gates are spaced generally longitudinally in a direction parallel to the pipe; the second portion of the mould cavity is disposed generally longitudinally beside the first portion; and the melt front advances along the pipe from the first gate toward the second gate. However, the melt front may also advance circumferentially within the mould cavity with respect to the pipe.

In this example, an annular melt front is preferably generated within the mould cavity. This may be achieved by injecting molten thermoplastics material through a group of first gates angularly spaced around the pipe and subsequently injecting molten thermoplastics material through a group of second gates angularly spaced around the pipe and spaced generally longitudinally from the group of first gates. It is preferred that injection takes place substantially simultaneously among the gates of each group. When the melt front progresses longitudinally in the cavity, a second group of gates angularly spaced around the field joint opens, causing the melt front to advance progressively along the cavity.

It is also preferred in this example that the first portion of the mould cavity is positioned downstream of the second portion of the mould cavity in a fabrication direction. This exposes the coolest and hence hardest part of the field joint coating first to the stresses of supports and tensioners during overboarding steps after the coating operation.

In another example, the first and second gates are angularly spaced around the pipe; the second portion of the mould cavity is disposed generally circumferentially beside the first portion; and the melt front advances around the pipe from the first gate toward the second gate. However, the melt front may also advance longitudinally within the mould cavity with respect to the pipe.

In this example, molten thermoplastics material may be injected through a group of first gates longitudinally spaced along the mould tool and molten thermoplastics material may be injected subsequently through a group of second gates longitudinally spaced along the mould tool and spaced generally circumferentially from the group of first gates. If the or each first gate is disposed on the mould tool at a level beneath the level of the or each second gate, this helps to cool and harden the underside of the field joint coating first. This may be advantageous as the underside of the field joint coating will bear the load of the pipe upon encountering pipe supports after the coating operation.

To cater for shrinkage during cooling of the plastics material, it is advantageous for the mould cavity to be radially deeper than the radial thickness of a coating on the pipes joined by the field joint. For example, the mould tool may comprise end sections of relatively small internal diameter and a central section of relatively large internal diameter.

Optionally, the invention may involve positioning an insert to lie within the mould cavity and injecting plastics material into the mould cavity to embed the insert in the plastics material. In that case, it is preferred to maintain a gap between a body of the insert and the pipe joints joined by the field joint to allow the plastics material to flow around the insert as the mould cavity fills. This may be achieved with spacer formations on the insert. It is also preferred that the plastics material flows through a body of the insert as the mould cavity fills. Passages such as holes may be provided in the body of the insert for that purpose. This ensures that the plastics material surrounds the insert in intimate contact and fills the mould.

Where used, an insert may be of a different material to the plastics material injected into the mould cavity. For example, the material of the insert may be relatively insulative in comparison with the plastics material injected into the mould cavity. This difference may be used to tailor the insulative properties of the field joint coating.

The method of the invention may also comprise: positioning a first mould tool around the field joint to define a first mould cavity; injecting plastics material into the first mould cavity to create an inner coating on the field joint; positioning a second mould tool around the field joint to define a second mould cavity around the inner coating; and injecting plastics material into the second mould cavity to create an outer coating on the field joint.

Different plastics materials may be injected into the first and second mould cavities. For example, a relatively insulative plastics material may be injected into the first mould cavity and a relatively strong plastics material may be injected into the second mould cavity. Again, this difference may be used to tailor the insulative properties of the field joint coating.

The mould tool may move with the pipe while injecting and/or cooling molten plastics material, in which case the mould tool may pass over a pipe support such as a roller or track associated with a stinger before the mould tool is removed from the pipe.

Where the field joint passes over a support after removing the mould tool from the pipe, the support suitably bridges a relatively hot part of the injected material by bearing upon a relatively cool part of the injected material and/or upon an adjacent pipe coating. It is also possible to interpose pads between the support and the pipe to keep the field joint clear of the support.

The invention may also be expressed in terms of apparatus for coating a joint of a pipe during fabrication of the pipe from pipe sections, the apparatus comprising: a mould tool that may be positioned around the joint to define a mould cavity and that has first and second gates through which molten thermoplastics material may be injected into the mould cavity, those gates being spaced apart from each other; a means for providing molten thermoplastics material; a means for injecting molten thermoplastics material o the mould tool; and a control unit arranged to control a coating process involving the mould tool; and the apparatus being arranged to inject molten thermoplastics material through the first gate into a first portion of the mould cavity to advance a melt front in the mould cavity toward the second gate, and subsequently to inject molten thermoplastics material through the second gate into a second portion of the mould cavity neighbouring the first portion; and to accelerate cooling of the injected material in the first portion of the mould cavity relative to cooling of the injected material in the second portion of the mould cavity.

The control unit suitably controls filling of the mould cavity by acting on valves associated with the gates, each gate having a respective valve under individual control of the control unit.

The mould tool may have at least one ramp surface on its underside for raising the mould tool over a pipe support such as a roller or track associated with a stinger, as the pipe and the mould tool move relative to the support.

The inventive concept extends to a pipelaying vessel comprising pipeline production facilities of the invention or apparatus of the invention.

The inventive concept further extends to a pipeline or a field joint for a pipeline, produced by the pipelaying vessel of the invention, by pipeline production facilities of the invention or by apparatus of the invention, or by performing any of the methods of the invention.

Reference has already been made to FIGS. 1a to 1c of the accompanying drawings to describe the prior art. In order that the invention may be more readily understood, reference will now be made, by way of example, to the remaining drawings in which:

FIGS. 1a, 1b, and 1c are schematic views showing an IMPP operation coating a field joint of a pipe.

FIGS. 4a to 4c are schematic longitudinal sectional detail views of the mould tool and field joint on line IV-IV of FIG. 3, showing the progression over time of a sequential injection moulding operation in accordance with the invention;

FIGS. 5a and 5b are schematic longitudinal sectional detail views of an alternative mould tool positioned around a field joint, showing the progression over time of another sequential injection moulding operation in accordance with the invention;

Figure 10:
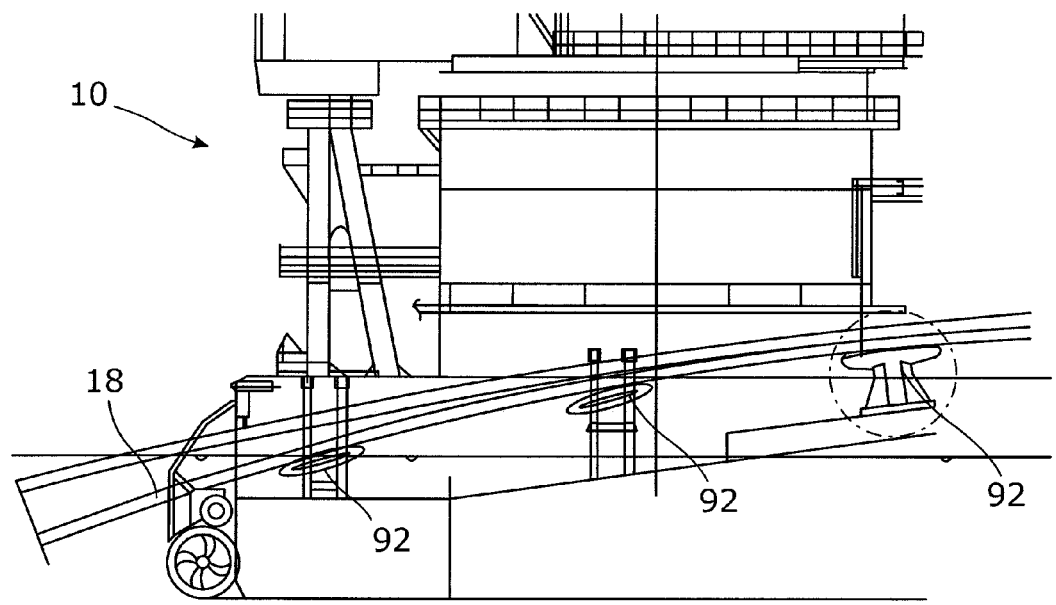
FIG. 10 is a side detail view of a stinger arrangement of a lay barge, in which rollers are replaced by continuous track supports.
Figure 11:
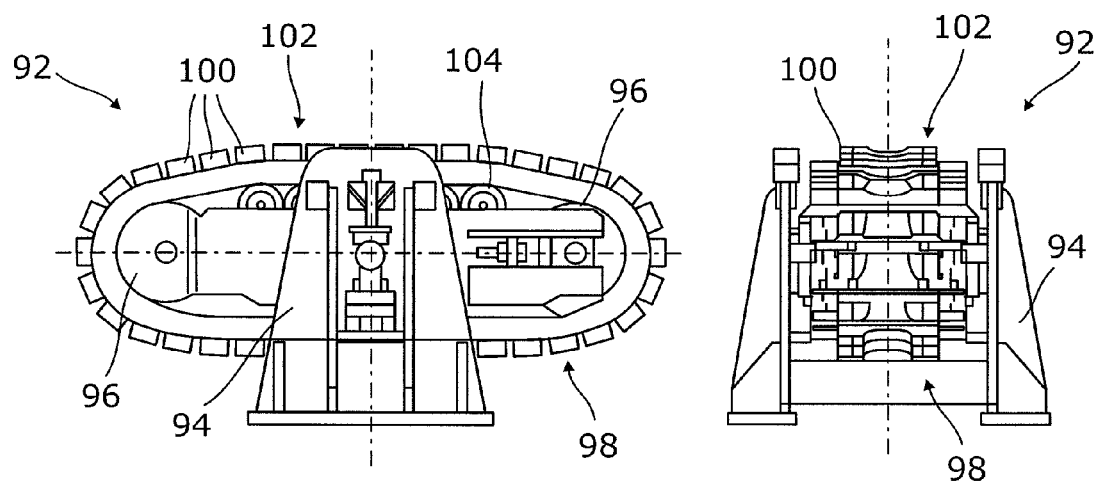
Figure 12:
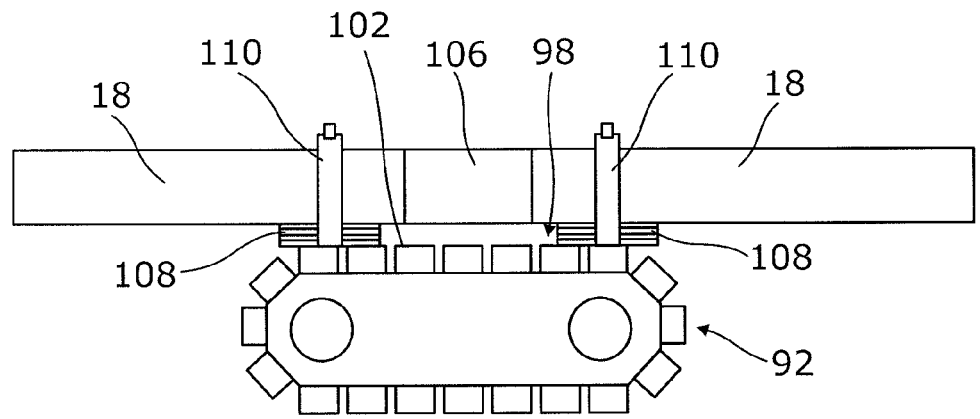
Figure 13:
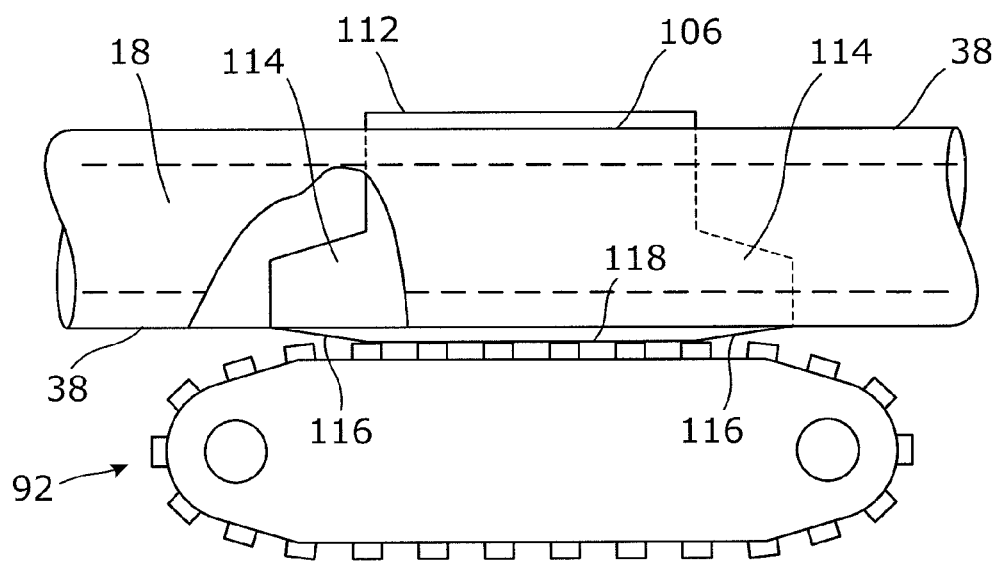

FIG. 11 comprises enlarged side and end views of a track support shown in FIG. 10;

FIG. 12 is a schematic side view of a field joint passing over a track support, showing measures to protect the field joint coating; and FIG. 13 is a schematic side view of a field joint passing over a track support, showing another measure to protect the field joint coating.

Figure 2:
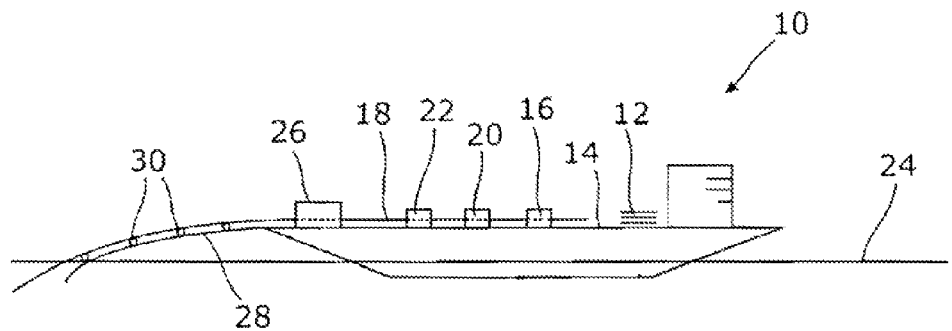
FIG. 2 is a schematic side view of a lay barge configured for S-lay operation, showing a typical context for the coating techniques of the present invention.
Figure 3:
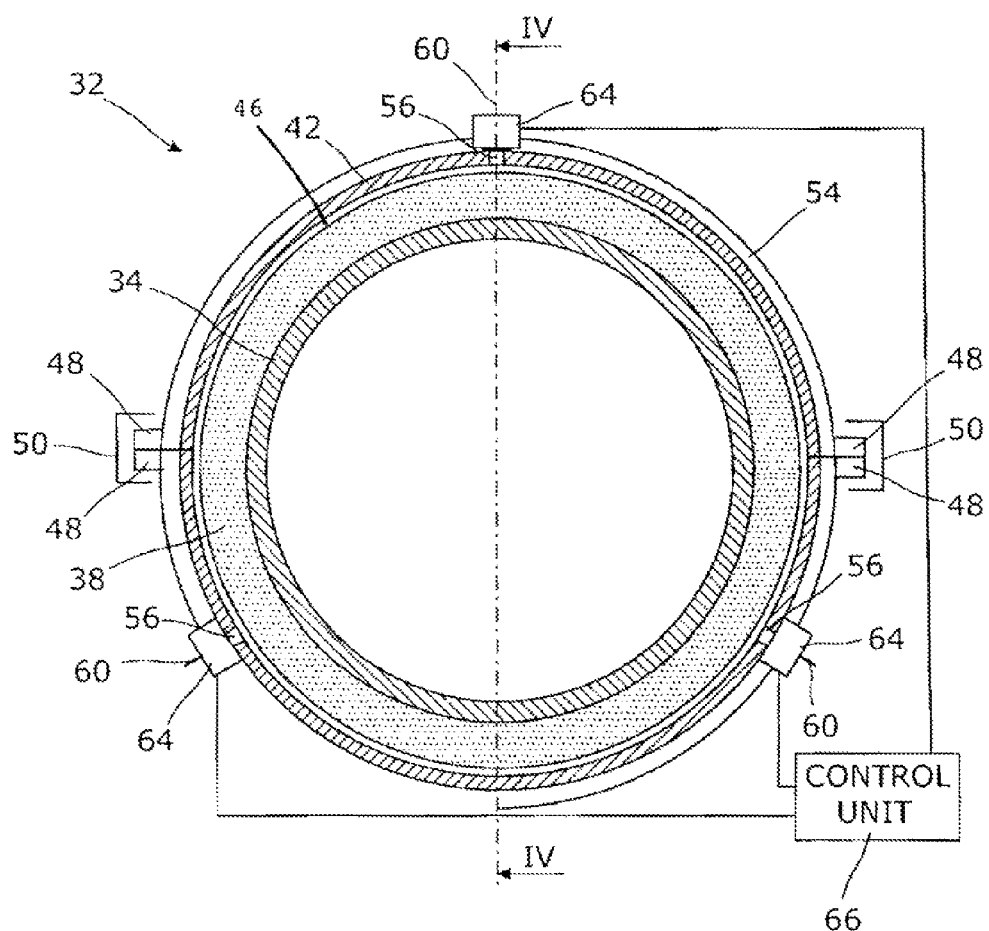
FIG. 3 is a schematic cross-sectional view on line III-III of FIG. 4a, showing a mould tool in accordance with the invention positioned around a field joint.

Referring firstly to the schematic view of FIG. 2 of the drawings, a pipelaying vessel 10 is configured for the S-lay installation method and moves from left to right as illustrated during a pipelaying operation. The vessel 10 carries a supply of pipe joints 12 on its deck 14 that are welded together at one or more welding stations 16 to form a pipe string 18 that moves aft with respect to the vessel 10 along a firing line. The welds are tested at one or more testing stations 20 located downstream (i.e. aft) of the welding stations 16 and are then coated at one or more coating stations 22 located downstream of the testing stations 20. The welding stations 16, testing stations 20 and coating stations 22 thus lie on the firing line along which the pipe string 18 moves as it is assembled, checked and coated before being launched from the vessel 10 into the sea 24.

The pipe string 18 is supported by a tensioner system 26 located downstream of the coating stations 22. The pipe string 18 is launched from the vessel 10 over a stinger 28 extending aft of the vessel 10, located downstream of the tensioner system 26. The stinger 28 comprises rollers 30 that support the overbend of the pipe string 18 as it enters the sea 24. The pipe string 18 hangs from the stinger 28 in a shallow S-shape under tension acting between the tensioner system 26 and a touchdown point on the sea bed (not shown).

It is of course possible for a pipe string to experience a much greater deflection through the overbend than is shown in FIG. 2, especially in so-called Steep S-lay operations in which the departure angle of the pipe string is close to vertical as it leaves the stinger.

The present invention is mainly concerned with coating operations performed at the coating stations 22 on the firing line, which will now be described with reference to FIGS. 3 to 6 of the drawings.

FIGS. 3 and 4a to 4c of the drawings show a mould tool 32 in accordance with the invention, encircling a welded field joint of a pipeline at a coating station 22.

Figure 1A:
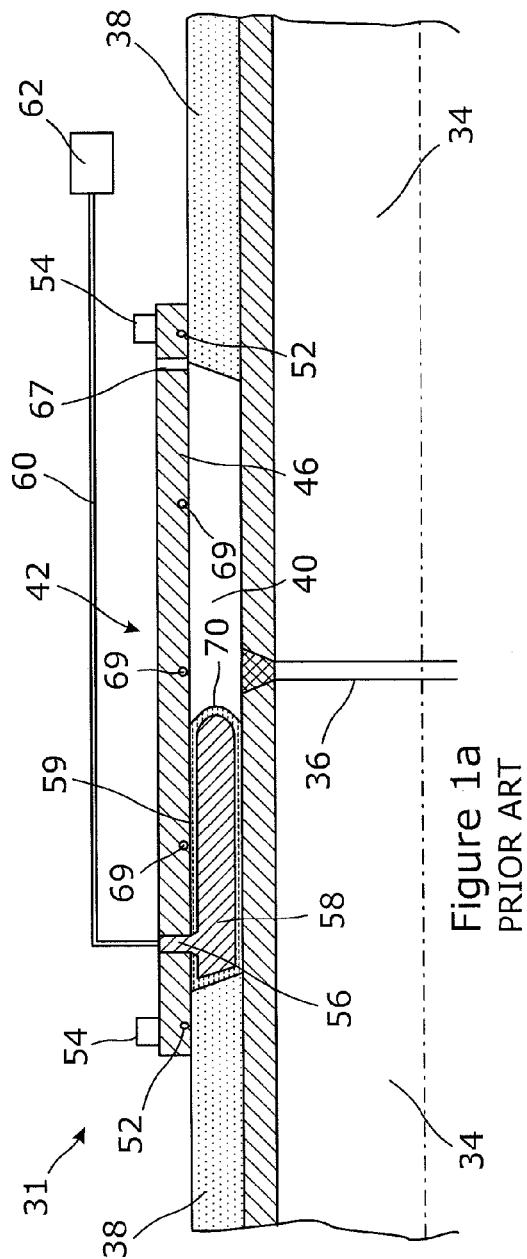
Figure 1B:
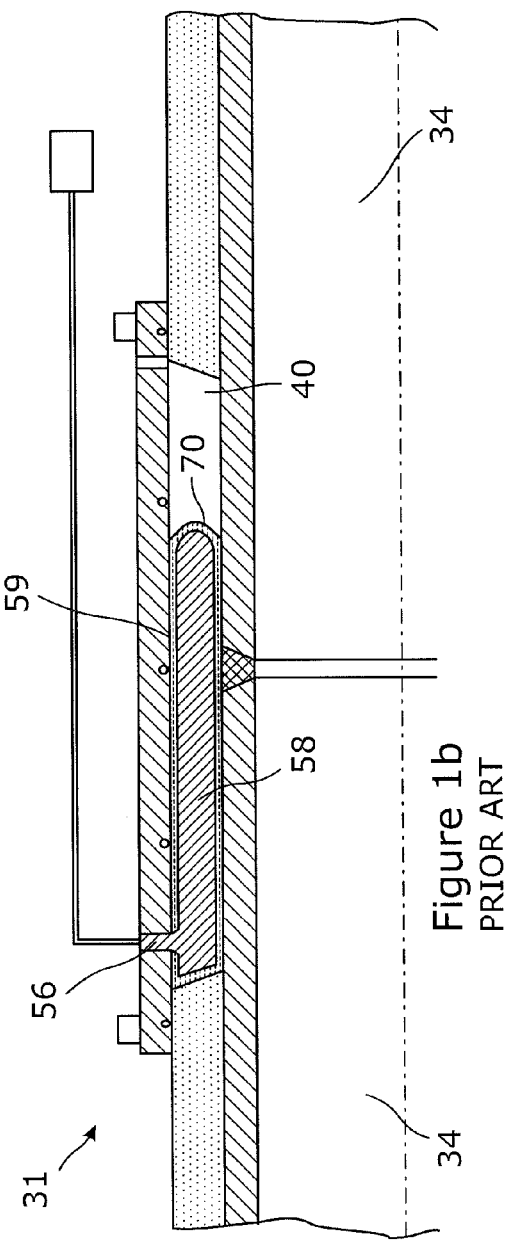
Figure 1C:
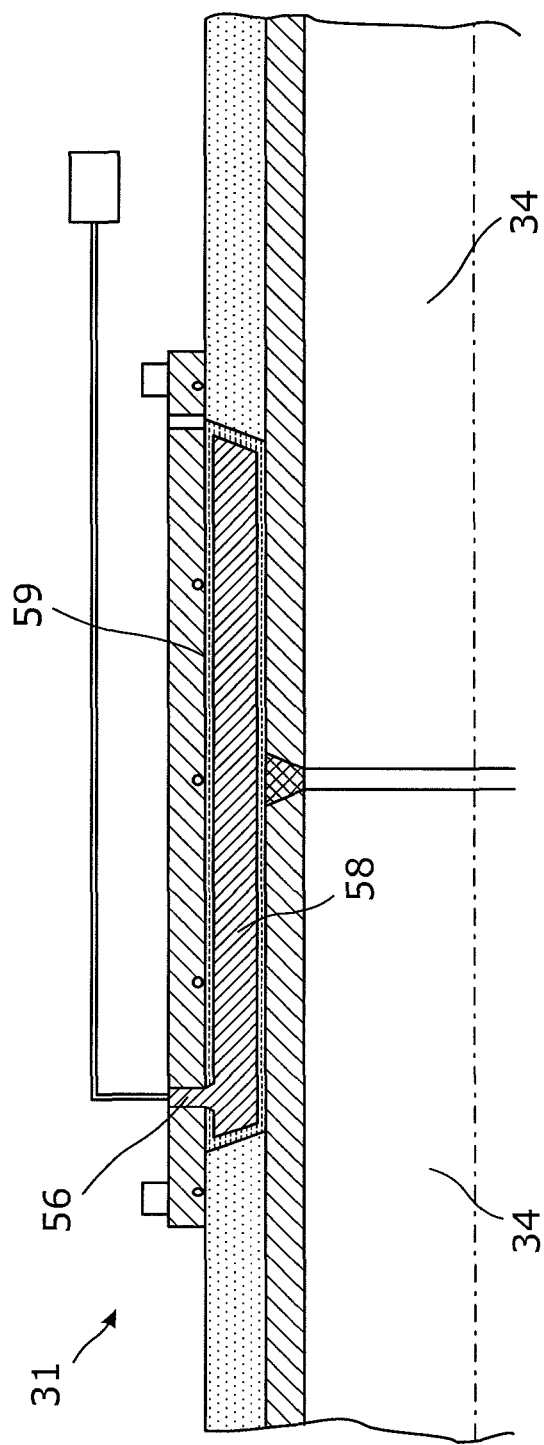

As in the prior art arrangement of FIGS. 1a to 1c, the field joint in FIGS. 4a to 4c is created between abutting pipe joints 34 where a circumferential weld 36 attaches the pipe joints 34 to each other. Each pipe joint 34 is coated, for example with a 5LPP coating 38, and that coating 38 terminates short of the end of each pipe joint 34 with a typically chamfered end shape. An annular gap lies between the opposed ends of the coating 38 around the weld 36, where the exposed external surfaces of the pipe joints 34 need to be coated. For this purpose, the mould tool 32 is fixed around the field joint, extending from one coating 38 to the other and overlapping those coatings 38 to define a mould cavity 40 including the annular gap between the coatings 38, into which molten thermoplastics material such as PP is injected as a field joint coating.

The mould tool 32 comprises a tube 42 of generally circular cross-section, divided longitudinally on a diameter of the cross-section into two halves. Opposed end portions 44 of the tube 42 seat against the coatings 38 of the respective pipe joints 34 and so have an internal diameter corresponding to the external diameter of the coated pipe joints 34. A central portion 46 of the tube 42 aligned with the gap between the coatings 38 has an increased internal diameter that exceeds the external diameter of the coated pipe joints 34. This enlarges the mould cavity 40 to allow for shrinkage of the injected plastics material as it cools.

The two halves of the mould tool 32 are assembled together to encircle the field joint. Where they meet, the two halves have flanges 48 that are clamped together by external clamps 50 represented schematically in FIG. 3. The clamps 50 hold together the two halves against internal pressure within the mould tool 32 in use; they also hold the mould tool 32 in sealing engagement with the coatings 38 of the pipe joints 34. Inwardly-facing seals 52 are provided in the end portions 44 of the mould tool for that purpose, as can be seen in FIGS. 4a to 4c. Stiffening rings 54 encircling the end portions 44 of the mould tool 32 also help to maintain structural integrity and sealing.

The tubular wall of the mould tool 32 is penetrated by an array of gates 56 for injection into the mould cavity 40 of molten PP 58 supplied through feed lines 60 under pressure from a supplying reservoir or machine 62. A total of nine gates 56 are shown in the example of FIGS. 3 and 4a to 4c; those gates 56 are disposed in three axially-spaced circumferential groups, each group comprising three gates 56 equi-angularly spaced around the circumference of the tubular wall. The groups of gates 56 are substantially equi-spaced but they are together offset toward one end of the mould tool 32, being the downstream end with respect to the firing line of the vessel 10.

Each gate 56 has a respective valve 64 that controls the injection of molten PP 58 through that gate 56. The valves 64 are controlled by a central control unit 66 shown in FIG. 3 and they may be operated independently of each other. To simplify illustration, poppet valve elements 68 are shown schematically in the valves 64 of FIGS. 4a to 4c; other valve types are, of course, possible.

A vent 67 at an upstream end of the tubular wall of the mould tool 32 allows air to escape as the mould cavity 40 fills with molten PP 58. The mould tool 32 also has an optional cooling system comprising a water jacket created by water pipes 69 disposed in or on the tubular wall of the mould tool 32.

In this example, the cooling system is supplemented by an optional pipe cooling device 71 that is positioned inside the pipe to cool the melt by accelerating conduction of heat through the pipe wall. The pipe cooling device 71 is movable longitudinally along the pipe to apply cooling where it is needed.

The pipe cooling device 71 could be a refrigerated pig but in this example it simply comprises a spray head 73. The spray head 73 sprays water radially outwardly against the inner circumference of the pipe wall to quench the molten PP 58 in the mould cavity 40 on the other side of the pipe wall. Water is thereby projected in a disc that lies in a plane orthogonal to the central longitudinal axis of the pipe. The spray head 73 is supported by a shaft 75 that lies on the central longitudinal axis of the pipe and that supplies the spray head 73 with water under pressure.

The shaft 75 is movable longitudinally with respect to the pipe to move the spray head 73 in a corresponding manner. A wheeled support 77 mounted on the shaft beside the spray head 73 allows for this longitudinal movement, while keeping the spray head 73 centred within the inner circumference of the pipe wall.

It is possible for cooling to be applied locally to the walls of the mould cavity 40 and for the cooling effect to be applied progressively or step-wise along the length of the mould tool 32 and/or the pipe to suit the desired progression and cooling of the melt within the mould cavity 40. In this context, the spray head 73 applies cooling in an advantageously localised manner so that an appropriate region of the melt may be cooled while an adjacent region of the melt remains internally molten due to continued injection of molten PP 58. This allows the molten PP 58 to continue to flow without excessive viscosity and without introducing excessive discontinuities in the cooling melt.

Before the injection moulding operation begins, the bare uncoated external surfaces of the pipe joints 34 are cleaned, primed and heated, as are the chamfered end surfaces of the coatings 38.

In FIG. 4a, the injection moulding operation has begun by opening the valves 64 of the first circumferential group of gates 56 at one end of the mould cavity 40. The result is an annular melt front 70 that has already filled that end of the mould cavity 40 and is now progressing along the mould cavity 40 toward the other end of the mould cavity 40. The outer perimeter of the injected melt has started to freeze to form solid PP 59 but the inner core of the injected melt remains as molten PP 58 while injection continues through the first circumferential group of gates 56. The valves 64 of the second and third circumferential groups of gates 56 remain closed at this stage.

Freezing of the injected melt to form solid PP is helped by the water pipes 69 of the mould tool 32 that cool the radially outer side of the mould cavity 40 and by the spray head 73 of the pipe cooling device 71 that cools the radially inner side of the mould cavity 40 via the wall of the pipe. In this respect, it will be noted that the spray head 73 is initially aligned with a downstream end of the mould cavity 40 with respect to the firing line of the vessel 10. It would similarly be possible, but perhaps less effective, to enable or disable the flow of cooling water through certain ones of the water pipes 69 or to vary the relative flow of cooling water through different water pipes 69 to concentrate cooling on certain parts of the mould tool 32.

In FIG. 4b, the melt front 70 has passed the second circumferential group of gates 56. Now, the valves 64 of the first circumferential group of gates 56 close and the valves 64 of the second circumferential group of gates 56 open. This cascade technique further propels the melt front 70 along the mould cavity 40 while maintaining homogeneity of the melt. In this respect, it is advantageous that the valves 64 of the second circumferential group of gates 56 only open when the melt front 70 has passed them; otherwise, there will be two melt fronts that may weld with dissimilar crystalline structures where they come together, which could introduce a weakness in the finished field joint coating.

Meanwhile, as the valves 64 of the first circumferential group of gates 56 have closed, the melt introduced through that first circumferential group no longer receives heat input and so is allowed to start cooling early while injection of melt continues elsewhere in the mould cavity 40. Cooling of the melt introduced through the first circumferential group of gates 56 is promoted by the optional application of local cooling. In this respect, the spray head 73 of the pipe cooling device 71 now applies cooling locally to a position slightly downstream of the second circumferential group of gates 56 with respect to the firing line of the vessel 10. It will be noted in FIG. 4b how the core of the melt near the first circumferential group of gates 56 has started to freeze to form solid PP 59.

In FIG. 4c, the injection moulding operation is almost complete. When the melt front 70 passed the third circumferential group of gates 56 near the opposite end of the mould cavity 40, the valves 64 of the second circumferential group of gates 56 closed and the valves 64 of the third circumferential group of gates 56 opened. Molten PP 58 injected through the third circumferential group of gates 56 fills the remainder of the mould cavity 40 while the melt in the region of the second circumferential group of gates 56 is able to start cooling quickly. Meanwhile the melt in the region of the first circumferential group of gates 56 has already cooled significantly as it approaches its ultimate strength.

Again, cooling of the melt introduced through the second circumferential group of gates 56 is promoted by the optional application of local cooling. In this respect, the spray head 73 of the pipe cooling device 71 now applies cooling locally to a position slightly downstream of the third circumferential group of gates 56 with respect to the firing line of the vessel 10. It will be noted in FIG. 4c how the core of the melt near the second circumferential group of gates 56 has started to freeze to form solid PP 59.

When the mould cavity 40 has been filled and all of the melt within has solidified to a self-supporting extent, the clamps 50 are released to separate and remove the two halves of the mould tool 32 from the field joint. As it sets, the injection-moulded material will shrink but the oversized central portion 46 of the mould tool 32 allows for this shrinkage so that the external diameter of the finished field joint coating approximates to the external diameter of the coated pipe joints 34 to either side of the field joint.

The sequential injection moulding operation described above has several advantages in the context of pipeline field joint coating. It enables quick cooling of thermoplastics materials, reducing cycle time to a level compatible with S-lay installation methods although it is emphasised that the process is also suitable for J-lay installation methods and for pipeline fabrication including reeling/spooling operations. Yet, the process of the invention produces a high-quality field joint coating. Also, it enables lower moulding pressure and hence lower clamping force as the viscous melt need only travel the short distance between the gates 56 rather than traversing the mould cavity 40 as a whole.

Other arrangements of gates 56 and valves 64 are possible, both in the number of gates 56 and their relative disposition around the tubular wall of the mould tool 32: for example, the gates 56 of neighbouring circumferential groups may be angularly offset with respect to each other. Variations are also possible in the sequence of operation of the valves 64: for example, the valves 64 of a circumferential group need not open simultaneously but their opening could be staggered, for example by delaying opening of the valve 64 of one gate 56 until the melt front 70 from another, previously opened gate 56 has passed it.

The valves 64 may open and close on a predefined timescale based on the assumption that the melt front 70 will move a certain distance over a certain time. It is also possible to open and close the valves 64 in response to detecting the position of the melt front 70, for example using temperature sensors or pressure sensors (not shown) on the mould tool 32.

It may be beneficial to advance the melt front 70 through the mould cavity 40 in the direction of motion of the vessel 10 during pipelaying, or in an upstream direction with respect to the firing line of the vessel 10. This ensures that the coolest and hence strongest part of the field joint coating is the first to meet the rollers 30 of the stinger 28, which gives more time for hotter parts of the field joint coating to cool and solidify before they too meet the rollers 30.

FIGS. 5a and 5b show an alternative sequential injection moulding arrangement using a mould tool 33 in which a first circumferential group of gates 56 is disposed between a pair of second circumferential groups of gates 56. Like numerals are used for like parts. Here, the injected melt has two melt fronts 70 that advance in opposite longitudinal directions from the first circumferential group of gates 56 toward and beyond respective ones of the second circumferential groups of gates 56.

At and soon after the start of the injection moulding operation as shown in FIG. 5*a*, the valves 64 of the first circumferential group of gates 56 are open and the valves 64 of the second circumferential groups of gates 56 are closed. Conversely FIG. 5*b* shows the injection moulding operation almost complete. When the melt fronts 70 passed the second circumferential groups of gates 56 near opposite ends of the mould cavity 40, the valves 64 of the first circumferential group of gates 56 closed and the valves 64 of the second circumferential groups of gates 56 opened. In FIG. 5*b*, molten PP 58 injected through the second circumferential groups of gates 56 has filled the remainder of the mould cavity 40 while the melt in the central region of the mould cavity 40 near the first circumferential group of gates 56 was able to start cooling quickly as soon as the valves 64 of that group of gates 56 closed. Consequently, the melt in the central region of the mould cavity 40 has started to freeze to form solid PP 59.

Whilst the pipe cooling device 71 of FIGS. 4*a*, 4*b* and 4*c* has been omitted from the embodiment shown in FIGS. 5*a* and 5*b*, it will be apparent that localised cooling may be applied through the pipe wall by similar means if required.

Figure 6A:
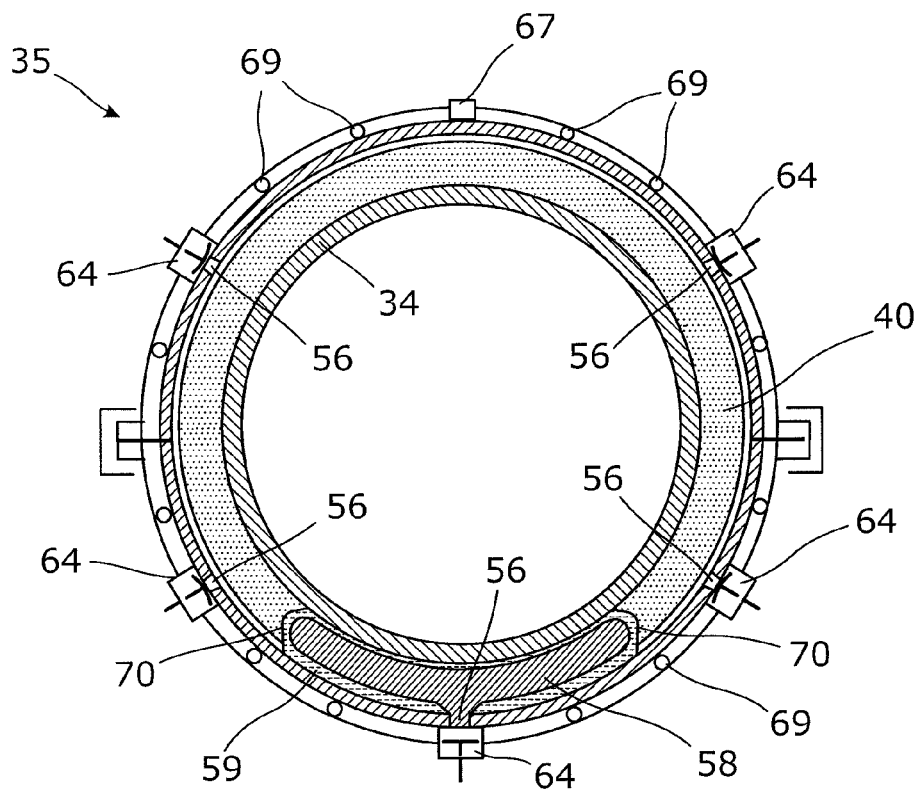
FIGS. 6a and 6b are schematic cross-sectional views of another mould tool in accordance with the invention positioned around a field joint, showing the progression over time of a further sequential injection moulding operation in accordance with the invention.
Figure 6B:
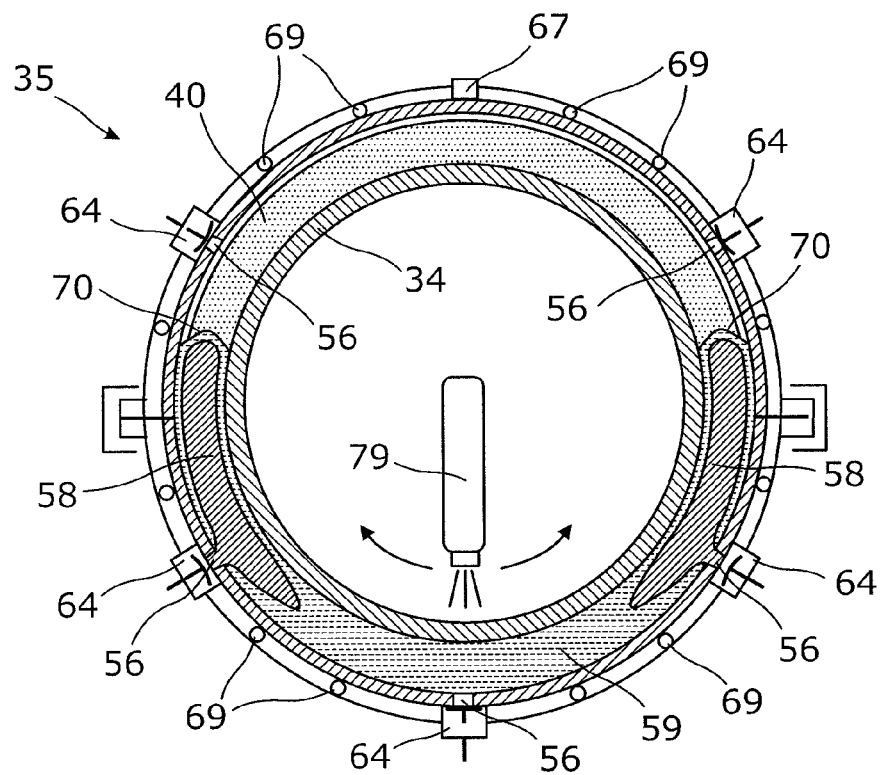

FIGS. 6*a* and 6*b* show a further sequential injection moulding arrangement using a mould tool 35 whose tubular wall is penetrated by an array of gates 56 that are angularly spaced from each other in a circumferential arrangement. A total of five gates 56 are shown in the example of FIGS. 6*a* and 6*b* in an arrangement that is symmetrical about a central longitudinal vertical plane of the mould tool 35. Those gates comprise a first gate 56 disposed centrally at the bottom of the mould tool 35, a pair of second gates 56 above the level of the first gate and a pair of third gates 56 above the level of the second gates 56.

As before, each gate 56 has a respective valve 64 (shown for ease of illustration as a poppet valve element) that controls the injection of molten PP 58 through that gate 56. The valves 64 are controlled by a central control unit such as that shown in FIG. 3.

A vent 67 at the top of the tubular wall of the mould tool 32 diametrically opposed to the first gate 56 allows air to escape as the mould cavity 40 fills with molten PP 58. The mould tool 32 also has an optional cooling system comprising a water jacket created by water pipes 69 disposed in or on the tubular wall of the mould tool 32.

In FIG. 6*a*, the injection moulding operation has begun by opening the valve 64 of the first gate 56 at the bottom of the mould cavity 40. This has created melt fronts 70 that are shown here progressing circumferentially in opposed angular directions around the pipe joints 34 in the mould cavity 40, clockwise and anticlockwise. The outer perimeter of the injected melt has started to freeze to form solid PP 59 but the inner core of the injected melt remains as molten PP 58 while injection continues through the first gate 56. The valves 64 of the second and third gates 56 remain closed at this stage.

Freezing of the injected melt to form solid PP is helped by the water pipes 69 of the mould tool 32 that cool the radially outer side of the mould cavity 40.

In FIG. 6*b*, the melt fronts 70 have passed the second gates 56. Now, the valve 64 of the first gate 56 closes and the valves 64 of the second gates 56 open. This cascade technique further propels the melt fronts 70 around the mould cavity 40 while maintaining homogeneity of the melt. As before, it is advantageous for homogeneity of the melt that the valves 64 of the second circumferential group of gates 56 only open when the melt front 70 has passed them.

Meanwhile, as the valve 64 of the first gate 56 has closed, the melt introduced through that first gate 56 no longer receives heat input and so is allowed to start cooling early while injection of melt continues elsewhere in the mould cavity 40.

Cooling of the melt introduced through the first gate 56 is promoted by the optional application of local cooling. In this respect, FIG. 6*b* shows how the cooling system may be supplemented by an optional pipe cooling device 79 that is positioned inside the pipe to cool the melt by accelerating conduction of heat through the pipe wall. The pipe cooling device 79 comprises a spray head that is pivotable about the central longitudinal axis of the pipe to apply cooling where it is needed. The spray head may, for example, oscillate to spray an arc that increases as the melt fronts 70 progress around the mould cavity 40. The spray head sprays water radially outwardly against the inner circumference of the pipe wall to quench the molten PP 58 in the mould cavity 40 on the other side of the pipe wall. This applies cooling in an advantageously localised manner so that an appropriate region of the melt may be cooled while an adjacent region of the melt remains internally molten due to continued injection of molten PP 58.

As before, it would also be possible to enable or disable the flow of cooling water through certain ones of the water pipes 69 or to vary the relative flow of cooling water through different water pipes 69 to concentrate cooling on certain parts of the mould tool 32.

FIGS. 7, 8*a*, 8*b* and 9 show other variants of the invention. They are shown in conjunction with gates 56 and valves 64 arranged for sequential injection moulding as in FIGS. 3 and 4*a* to 4*c*.

Figure 7:
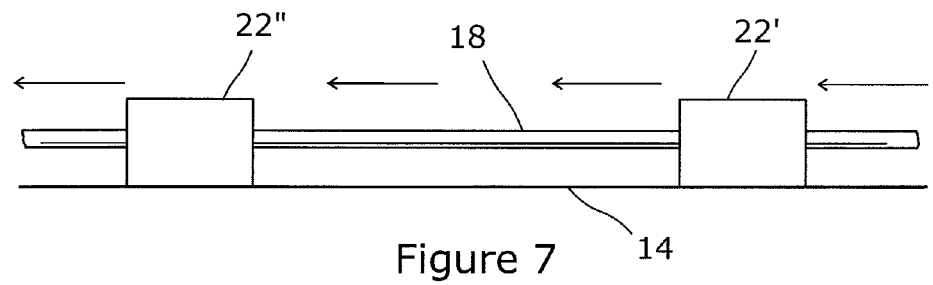
FIG. 7 is a schematic side view of upstream and downstream coating stations in the firing line on a vessel as shown in FIG. 2.
Figure 8A:
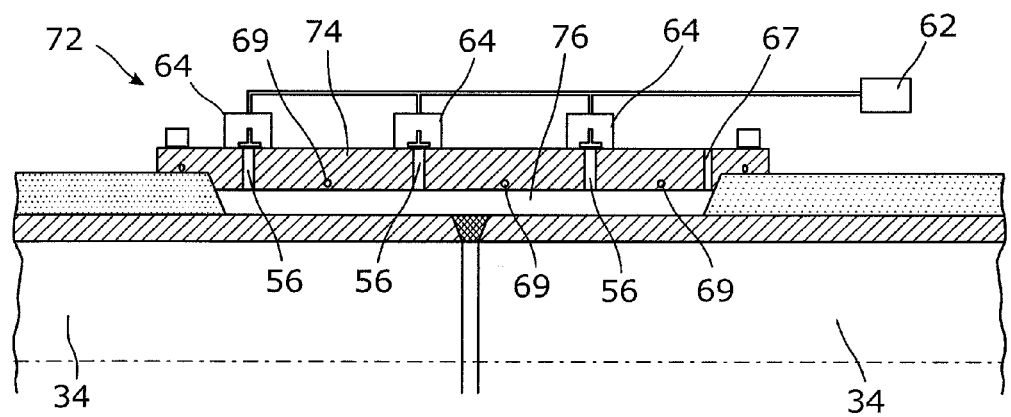
FIGS. 8a and 8b are schematic longitudinal sectional detail views of different mould tools around a field joint in a variant of the invention in which successive moulding operations are performed at the upstream and downstream coating stations shown in FIG. 7.
Figure 8B:
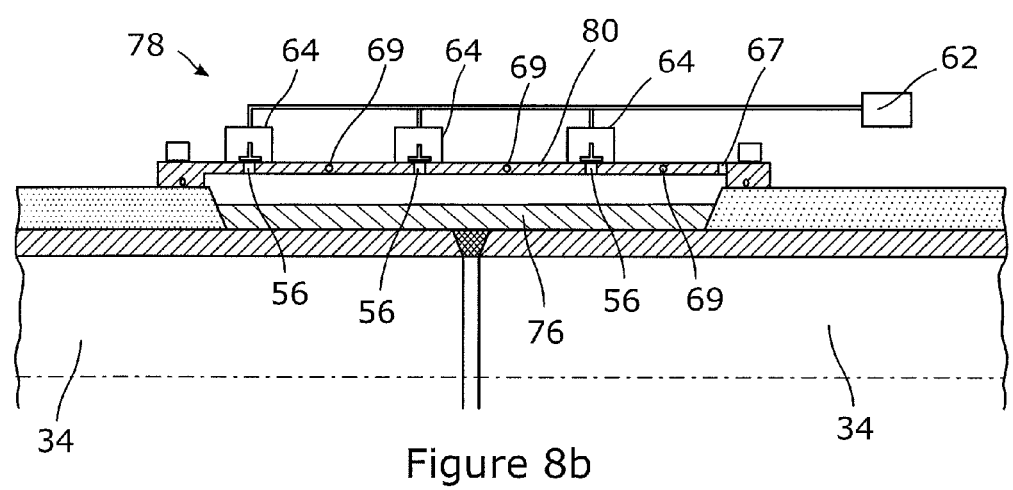

The variant shown in FIGS. 7, 8*a* and 8*b* is specific to S-lay and contemplates successive coating stations 22', 22" in the firing line working simultaneously on successive pipe joints 34, as shown in FIG. 7. An upstream coating station 22' applies a thin inner injection-moulded coating that cools and hardens quickly, particularly as it has a low volume in relation to its surface area. A downstream coating station 22" applies a further thin outer injection-moulded coating atop the inner coating, which similarly cools and hardens quickly. Together, the thicknesses of the inner and outer coatings, after shrinkage, substantially equate to the thickness of the pipe joint coatings.

For this purpose, different mould tools are used at the different coating stations 22', 22". The upstream coating station 22' has a first mould tool 72 shown in FIG. 8*a* having a thick wall 74 in its central portion and a correspondingly small internal diameter that is less than the external diameter of the coated pipe joints 34. This produces a thin inner coating in a first sequential injection-moulding operation. In contrast, the second mould tool 78 shown in FIG. 8*b* used at the downstream coating station 22" is much the same as the mould tool 32 shown in FIGS. 3 and 4*a* to 4*c*, with a thinner wall 80 in its central portion and a correspondingly large internal diameter that is greater than the external diameter of the coated pipe joints 34. Here, the second mould tool 78 is shown before starting a second sequential injection-moulding operation to overlay a further thin outer coating over the inner coating 76 already formed at the upstream coating station 22'.

The inner and outer coatings may be of the same material, such as PP, or may be of dissimilar materials to optimise properties such as insulation. For example, the inner coating may be GSPP for insulation and the outer coating may be solid PP for protection and increased heat capacity.

Figure 9:
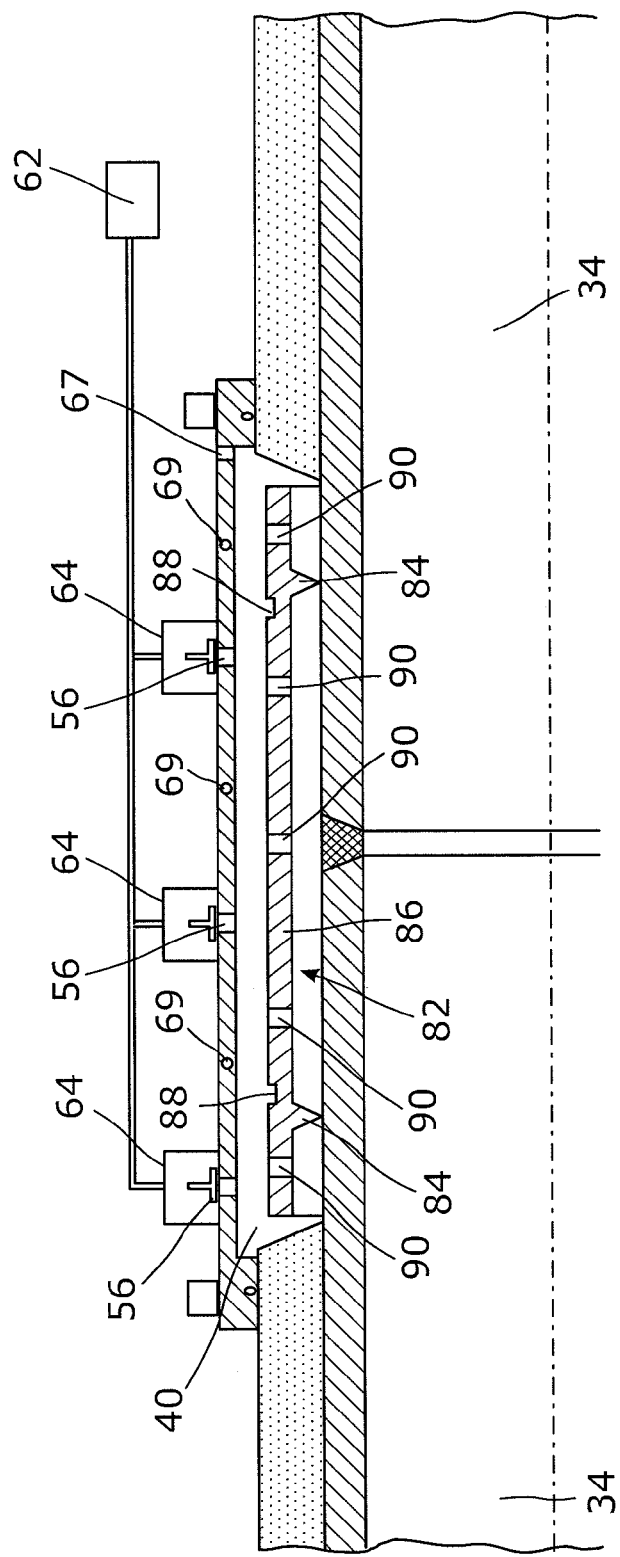
FIG. 9 is a schematic longitudinal sectional detail view of a mould tool around a field joint in a further variant of the invention in which an insert is embedded in injection-moulded plastics.

Referring next to FIG. 9 of the drawings, FIG. 9 shows a variant of the invention in which an insert 82 is positioned in the mould cavity 40 to be embedded in molten plastics during a sequential injection-moulding operation.

The insert 82 is a thermoplastics tube (of, for example, solid PP or GSPP) in two or more sections that are brought together around the prepared and heated field joint; the insert 82 may itself be heated and primed to promote adhesion of the melt to the insert 82.

Like the arrangement shown in FIG. 7, the insert 82 may be attached to the field joint at an upstream station before a mould is positioned around the field joint and the insert at a downstream station.

The insert 82 comprises tapered spacer formations 84 that space the tubular body 86 of the insert 82 from the bare exterior of the pipe joints 34, and annular recesses 88 around the tubular body 86 whereby the sections of the insert 82 may be strapped around the field joint. The tubular body 86 of the insert is also penetrated by holes 90 through which molten plastics may flow during moulding, aiding filling of the mould cavity 40 and ensuring a strong mechanical connection between the hardened melt and the insert 82.

The insert 82 reduces the volume of the melt and increases the ratio of the surface or interface area of the melt relative to its volume, to the benefit of cooling time. The insert 82 serves as a heat sink that promotes cooling of the melt; the insert also reinforces the field joint coating to help it survive the forces of tensioning and launching over the stinger 28. Also, if made of an insulating material like GSPP, the insert 82 may confer desired insulating properties on the field joint coating.

FIGS. 10 to 13 show how the rollers 30 of a stinger 28 may be replaced by continuous track supports 92, which have the benefit of spreading the load of the pipe string 18 across a large contact area. In this way, the field joint coating may be allowed to reach the supports 92 before all or part of the newly-coated region has reached full hardness. A similar effect may be achieved by enlarging the radius of the rollers 30, or with belts running over paired rollers of the stinger 28. The continuous track supports 92 shown in FIGS. 10 to 13 could therefore be replaced by a roller 30 or by a series of rollers, with or without belts running over them.

The overall firing line cycle time may be reduced by spreading the cooling time over more than one cycle. In an S-lay operation, this involves allowing cool-down to take place over one, two or three rollers 30 or other supports 92 after the coating station 22. To achieve this the pipe string 18 must be supported over the length of the field joint coating or at least over the length of the still-soft part of the field joint coating. Thus, the radius of a roller 30, the length of a belt section bridging rollers or the length of a continuous track support 92 must be such as to bear on an already-cooled part of the field joint coating and/or on the adjacent pipe coating 38, effectively to bridge any still-soft part of the field joint coating.

FIG. 10 shows a series of continuous track supports 92 spaced along and aligned with the longitudinal axis of the pipe string 18, whereas FIG. 11 shows one of the continuous track supports 92 of FIG. 9 in more detail. FIG. 11 shows that a T-shaped frame 94 supports a pair of main wheels 96, one at each end of the frame 94. A track 98 comprising resilient articulated links 100 turns around the main wheels 96 in a continuous loop aligned with the longitudinal axis of the pipe string 18.

An upper side of the loop of the track 98 defines a support surface 102 for the pipe string 18. The support surface 102 is supported along its length by auxiliary wheels 104 within the loop. As best seen in the end view of FIG. 11, the links 100 of the track 98 are concave-dished in transverse cross-section so that the support surface 102 is longitudinally-grooved to locate the pipe string 18 laterally. Other than that, the support surface 102 is approximately planar allowing for shallow ramp portions at each end. The straight length of the support surface 102 is of the order of the field joint length: for example, about 750 mm.

The main wheels 96 may turn passively with the track 98, whose movement is driven by movement of the pipe string 18 in its launch direction, driven in turn by relative movement of the vessel 10 and controlled by the tensioner system 26. Alternatively, at least one of the main wheels 96 may drive movement of the track 98 to match movement of the pipe string 18 in its launch direction, if a main wheel 96 is powered by a suitable electric or hydraulic motor (not shown).

Moving on now to FIG. 12, this shows schematically how a field joint coating 106 may be protected as a pipe string 18 traverses a continuous track support 92. Here, the field joint coating 106 is kept clear of the support surface 102 of the track 98 by resilient pads 108 disposed under the pipe string 18. The pads 108 may, for example, be of layered neoprene rubber. One pad 108 is disposed on each side of the field joint coating 106 and each pad 108 is suitably strapped to the pipe string 18 by a respective bungee strap 110.

The spacing between the pads 108 is such that the support surface 102 of the track 98 bridges the gap between them and the portion of track 98 between the pads 108 does not come into contact with the field joint coating 106. Once the field joint coating 106 has cleared the support 92, the bungee straps 110 are undone to remove the pads 108 for re-use in protecting the next field joint coating to pass over the support 92.

Turning finally to FIG. 13, this shows schematically how a mould tool 112 may travel with the pipe string 18 across a support 92, thus giving more time for moulding and cooling operations to take place. Indeed, this allows the field joint coating 106 within the mould tool 112 to traverse the support 92 before that coating 106 is cool enough to resist damage or to be self-supporting, or even before the coating 106 is complete.

It will be noted that the mould tool 112 shown in FIG. 13 has adaptations to assist its passage over the support 92. These adaptations comprise longitudinal extensions 114 at each end of the mould tool 112 on its lower side, which extensions overlay the pipe coatings 38 adjacent the field joint coating 106. Each extension 114 comprises a frusto-conical ramp surface 116 tapering upwardly and longitudinally from the central wall 118 of the mould tool 112 to the outer surface of the pipe coatings 38 under each extension 114.

Once the mould tool 112 and the field joint coating 106 have cleared the support 92 and the field joint coating 106 is solid enough to survive further tensioning or overboarding steps, the mould tool 112 is disassembled and removed from the pipe string 18. Further overboarding steps may involve the field joint traversing further rollers or other supports and may therefore use any of the abovementioned solutions to protect the newly-formed field joint coating 106. The mould tool 112 may then be reassembled and re-used to form a subsequent field joint coating on the pipe string 18 upstream of the support 92. Whilst an additional mould tool may be needed in this system, the available cooling time is advantageously increased by the duration of one pipelay cycle and possibly more, without adversely affecting the critical path.

The thermoplastics material used for injection moulding may be PP, polystyrene or other suitable thermoplastics material that is compatible with the coating applied to the pipe joints. Additives or modifiers may be employed, such as an elastomeric modifier like EDPM (ethylene propylene diene monomer rubber) to provide appropriate flexibility and impact resistance, or fibres of glass, aramid or carbon to increase strength and elastic modulus. Additives such as fibres may also reduce shrinkage and speed cooling.

By virtue of the invention, it is envisaged that the cooling time after injection may be reduced to three or four minutes. This enables the use of advantageous injection moulding for field joint coating of compatible thermoplastics in time-critical applications such as S-lay or J-lay pipeline installation operations, and in other pipeline fabrication operations, without the disadvantages of incompatibility suffered by coating materials such as PU.

The invention claimed is:

1. A method of coating a joint of a pipe during fabrication of the pipe from pipe sections, comprising:
    positioning a mold tool around the joint to define a mold cavity around the pipe, the mold tool having first and second gates spaced apart from each other;
    positioning an insert to lie within the mold cavity;
    injecting molten thermoplastic material through the first gate into a first portion of the mold cavity to advance a melt front in the mold cavity toward the second gate;
    subsequently injecting molten thermoplastic material through the second gate into a second portion of the mold cavity neighboring the first portion;
    maintaining a gap between a body of the insert and the pipe to allow the molten thermoplastic material to flow around the insert as the mold cavity fills, wherein the molten thermoplastic material flows through a body of the insert as the mold cavity fills, to embed the insert in the molten thermoplastic material injected into the mold cavity;
    accelerating cooling of the injected material in the first portion of the mold cavity relative to cooling of the injected material in the second portion of the mold cavity; and
    removing the mold tool from the joint after the injected material in the mold cavity has cooled to a self-supporting extent.

2. The method of claim 1, comprising accelerating cooling of the injected material in the first portion of the cavity by reducing a rate of injection, or ceasing injection, through the first gate while injecting through the second gate.

3. The method of claim 1, comprising accelerating cooling of the injected material in the first portion of the mold cavity by cooling the mold tool or the pipe in the region of the first portion.

4. The method of claim 3, wherein cooling is applied locally to the mold tool or the pipe at a cooling position that is moved in accordance with the movement of the melt front.

5. The method of claim 1, comprising injecting molten thermoplastic material through the second gate after the melt front passes the second gate.

6. The method of claim 1, comprising injecting molten thermoplastic material through an additional first gate situated between a first and second group of second gates to advance melt fronts in opposing directions from the first gate toward the second gates.

7. The method of claim 1, wherein the mold tool has a plurality of first and second gates and further comprising injecting molten thermoplastic material through the plurality of first and second gates angularly spaced around the field joint.

8. The method of claim 1, wherein the first and second gates are spaced generally longitudinally in a direction parallel to the pipe; the second portion of the mold cavity is disposed longitudinally beside the first portion; and the melt front advances along the pipe from the first gate toward the second gate.

9. The method of claim 8, wherein the melt front also advances circumferentially within the mold cavity with respect to the pipe.

10. The method of claim 8, wherein the mold tool has a plurality of first and second gates and further comprising injecting molten thermoplastic material through a group of first gates angularly spaced around the pipe and subsequently injecting molten thermoplastic material through a group of second gates angularly spaced around the pipe and spaced generally longitudinally from the group of first gates.

11. The method of claim 1, comprising generating an annular melt front within the mold cavity.

12. The method of claim 1, wherein the first portion of the mold cavity is positioned downstream of the second portion of the mold cavity in a fabrication direction.

13. The method of claim 1, wherein the first and second gates are angularly spaced around the pipe; the second portion of the mold cavity is disposed generally circumferentially beside the first portion; and the melt front advances around the pipe from the first gate toward the second gate.

14. The method of claim 13, wherein the melt front also advances longitudinally within the mold cavity with respect to the pipe.

15. The method of claim 13, wherein the mold tool has a plurality of first and second gates and further comprising injecting molten thermoplastic material through a group of first gates longitudinally spaced along the mold tool and subsequently injecting molten thermoplastic material through a group of second gates longitudinally spaced along the mold tool and spaced generally circumferentially from the group of first gates.

16. The method of claim 13, wherein the, or each, first gate is disposed on the mold tool at a level beneath that of the or each second gate.

17. The method of claim 1, wherein the mold cavity is radially deeper than the radial thickness of a coating on the pipes joined by the field joint.

18. The method of claim 1, wherein the insert is of a different material to the material injected into the mold cavity.

19. The method of claim 18, wherein the material of the insert is made of an insulating material.

20. A method of coating a field joint of a pipe during fabrication of the pipe from pipe sections, comprising:
    positioning a first mold tool around the field joint to define a first mold cavity;
    injecting plastic material into the first mold cavity to create an inner coating on the field joint;
    positioning a second mold tool around the field joint to define a second mold cavity around the inner coating; and
    injecting plastic material into the second mold cavity to create an outer coating on the field joint,
    wherein the inner coating is injected according to the method of claim 1.

21. The method of claim 20, wherein at least one different plastic material is injected into the first and second mold cavities.

22. The method of claim 21, wherein said plastic material includes a thermoplastic material and a thermoset material.

23. The method of claim 21, wherein an insulative plastic material is injected into the first mold cavity and a different plastic material is injected into the second mold cavity.

24. The method of claim 21, wherein the plastic material injected into the second mold cavity has a higher heat capacity than the plastic material injected into the first mold cavity.

25. The method of claim 1, comprising unitarily moving the mold tool with the pipe while injecting and/or cooling molten plastic material.

26. The method of claim 25, comprising passing the mold tool over a pipe support before removing the mold tool from the pipe.

27. The method of claim 1, comprising passing the joint over a support after removing the mold tool from the pipe, the support bridging a relatively hot part of the injected material, which is shorter than the support, by bearing upon a relatively cool part of the injected material and/or upon an adjacent pipe coating.

28. The method of claim 1, comprising passing the joint over a support after removing the mold tool from the pipe and interposing pads between the support and the pipe to keep the field joint clear of the support.

29. An apparatus for coating a joint of a pipe during fabrication of the pipe from pipe sections, the apparatus comprising:
- a mold tool that may be positioned around the joint to define a mold cavity and that has first and second gates through which molten thermoplastic material may be injected into the mold cavity, those gates being spaced apart from each other;
- an insert positionable within the mold cavity to be embedded in the molten thermoplastics material injected into the mold cavity, wherein the insert comprises at least one spacer formation arranged to maintain a gap between a body of the insert and pipes joined by a field joint;
- a means for providing molten thermoplastic material;
- a means for injecting molten thermoplastic material into the mold tool; and
- a control unit arranged to control a coating process involving the mold tool;
- and the apparatus being arranged to inject molten thermoplastic material through the first gate into a first portion of the mold cavity to advance a melt front in the mold cavity toward the second gate, and subsequently to inject molten thermoplastic material through the second gate into a second portion of the mold cavity neighboring the first portion; and to accelerate cooling of the injected material in the first portion of the mold cavity relative to cooling of the injected material in the second portion of the mold cavity.

30. The apparatus of claim 29 being arranged to advance the melt front along the mold cavity, wherein the first and second gates are spaced longitudinally in a direction parallel to the pipe and the second portion of the mold cavity is disposed longitudinally beside the first portion of the mold cavity.

31. The apparatus of claim 29, further comprising a cooling means that is movable to apply cooling locally at a cooling position that moves in accordance with the movement of the melt front.

32. The apparatus of claim 29, wherein the control unit controls filling of the mold cavity by acting on valves associated with the gates, each gate having a respective valve under individual control of the control unit.

33. The apparatus of claim 29, wherein the mold tool has a tubular wall around which the gates are distributed circumferentially.

34. The apparatus of claim 29, wherein the mold tool comprises circular end sections and a circular central section wherein the diameter of the central section is large relative to the diameters of the end sections.

35. The apparatus of claim 29, wherein the mold tool comprises at least one ramp surface on its underside for raising the mold tool over a pipe support as the pipe and the mold tool move relative to a pipe support.

36. The apparatus of claim 29, wherein the insert comprises at least one passage extending through a body of the insert.

37. The apparatus of claim 29, wherein said mold tool is a first mold tool, the apparatus further including a second mold tool, said mold tools positionable successively around the field joint to define first and second mold cavities respectively, the second mold tool having a greater internal mold cavity diameter than that of the first mold tool to overlay an outer coating on an inner coating produced by the first mold tool.

38. A pipeline production facility comprising the apparatus of claim 37, wherein plastic material is injected into the first mold cavity at an upstream coating station and plastic material is injected into the second mold cavity at a downstream coating station with respect to a direction of movement of a pipeline being produced by the facility.

39. A pipelaying vessel comprising a pipeline production facility as defined in claim 38.

40. A pipeline production facility comprising the apparatus of claim 29, wherein the insert is positioned on a field joint at an upstream station and the mold tool is positioned around a field joint at a downstream station with respect to a direction of movement of a pipeline being produced by the facility.

41. A pipelaying vessel comprising a pipeline production facility as defined in claim 40.

42. A pipelaying vessel comprising apparatus as defined in claim 29.

* * * * *